June 5, 1934.  R. E. MAY  1,962,025
GARDEN TOOL
Filed Aug. 25, 1933
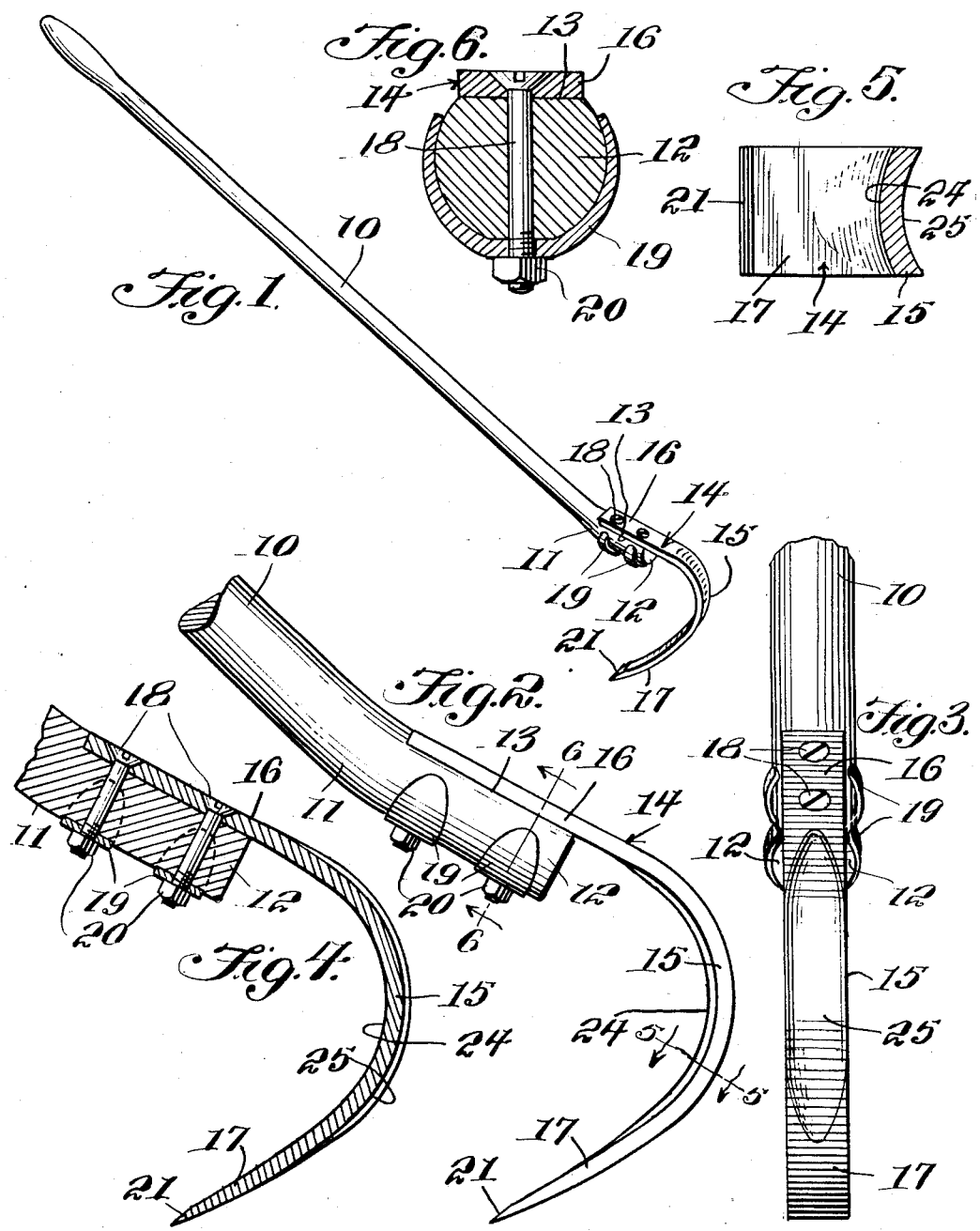
Richard E. May, INVENTOR
BY Victor J. Evans & Co., ATTORNEY
WITNESS: J. T. L. Wright Patented June 5, 1934

1,962,025

UNITED STATES PATENT OFFICE 1,962,025

GARDEN TOOL

Richard E. May, White Hall, Ill.

Application August 25, 1933, Serial No. 686,822

1 Claim. (Cl. 97—63)

The invention relates to a tool and more especially to a garden tool.

The primary object of the invention is the provision of a tool of this character, wherein at the end of a handle is located a tine or prong, the same being so shaped as to have its working end curved rearwardly and formed with a knife edge so that the tool will be most handy for ground working, particularly for removing weeds or noxious plants as the tine or prong will not cultivate these plants but will kill the same by uprooting them when deeply seated in the ground, the tool being also usable for cutting dandelions from a lawn and shrubbery, walk edge trimming, and pulverizing or working soil to a considerable depth.

Another object of the invention is the provision of a tool of this character, wherein its construction is novel and affords an all-around garden implement and weeding tool.

A further object of the invention is the provision of a tool of this character, which is simple in construction, thoroughly reliable and efficient in its purpose, readily and easily handled, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a perspective view of the tool constructed in accordance with the invention.

Figure 2 is a fragmentary side elevation showing the same.

Figure 3 is a top view thereof.

Figure 4 is a vertical longitudinal sectional view.

Figure 5 is a sectional view on the line 5—5 of Figure 2 looking in the direction of the arrows.

Figure 6 is a sectional view on the line 6—6 of Figure 2 looking in the direction of the arrows.

Similar reference characters indicate corresponding parts throughout the several views in the drawing.

Referring to the drawing in detail, the tool comprises a handle 10 having near one end thereof a bight 11 to angularly dispose the end 12 with respect to the remaining portion of said handle and this end 12 is cut into to provide a seat 13 for the ground working part of the tool.

The ground working part of the tool comprises a tine or prong 14 which is made from a flat narrow strip of steel, the narrow width thereof being uniform from end to end of said strip. This strip is bent or curved intermediate thereof as at 15 so as to have the end portions 16 and 17, respectively, rearwardly divergent with respect to each other. The end portion 16 is straight and is accommodated in the seat 13 where the tine or prong is made fast to the end 12 of the handle 10 by bolts 18, these being passed through suitable holes in the prong or tine and also in the end 12 and engaged with cleats 19 embracing said end 12 opposite the end portion 16 when in the seat. The bolts carry nuts 20 which secure the same for the joining of the tine or prong with the handle of the tool. The end portion 17 is slightly curved in a rearward direction and has a straight transverse beveled cutting edge 21. This end portion 17 with the cutting edge 21 is the ground working extent of the tool.

The intermediate curved portion 15 of the tine of prong has an inner convexed side 24 and outer concaved side 25 for materially strengthening the tine or prong.

It is needless to describe in detail the working of the tool for gardening purposes because this remains solely with the user of the implement yet it will be stated that by reason of the construction of such tool deep cutting action in the ground may be had for uprooting deep rooted or seated plants.

What is claimed is:

The combination of a handle having a bight to provide a short angular end formed with a recess providing a seat in its upper side, a prong formed from a flat strip-like piece bent intermediate of its length to provide rearwardly divergent end portions, one end portion overlapping the short angular end of the handle and received in the seat and the other end being free, a straight transversely beveled cutting edge at the said other free end of the prong, the prong being relatively narrow and of uniform width throughout its extent, and fasteners securing the prong to the angular end of said handles.

RICHARD E. MAY.